Figure 1:
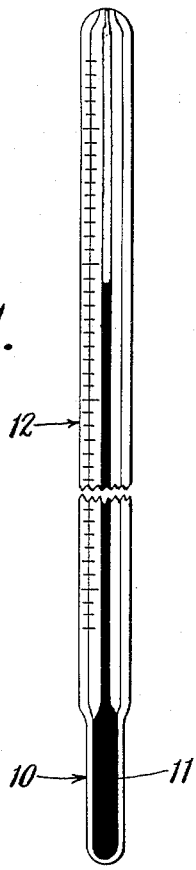

Dec. 26, 1950     C. O. FAIRCHILD     2,535,629
THERMOMETER TUBE
Filed July 8, 1947

INVENTOR.
CHARLES OWEN FAIRCHILD
BY
E. C. Sanborn
ATTORNEY

Patented Dec. 26, 1950

2,535,629

UNITED STATES PATENT OFFICE 2,535,629

THERMOMETER TUBE

Charles O. Fairchild, St. Albans, N. Y.

Application July 8, 1947, Serial No. 759,569

11 Claims. (Cl. 73—371)

This invention relates to improvements in thermometers, and is especially applicable to the mercury-in-glass type of thermometer. More particularly, the invention relates to improvements in the construction of thermometer tubes.

Thermometers, especially those of the mercury-in-glass type having a lens front, are frequently difficult to read. One difficulty encountered is that light entering the thermometer from the sides may be totally internally reflected from the empty bore, causing the bore to glow brightly and to be indistinguishable from the mercury under certain lighting conditions.

In certain previous constructions, the lens on the front of the thermometer is focused directly on the bore, thus magnifying the bore so greatly that the field of view through the lens is much smaller than the virtual image of the bore, and as a result, only the central portion of the front side of the bore is visible from a position near the axial plane of the lens. This part of the front side of the bore is nearly perpendicular to the axis of sight. With such a construction, if the observer's eye is very near the axial plane of the lens, total internal reflections from the empty bore may be largely avoided, but this construction is quite disadvantageous, however, in that if the observer's eye is any appreciable distance from the axial plane of the lens, the sides of the bore become visible, and the difficulty of total internal reflection is encountered. The reflected light will, at the high magnification used, nearly fill the field of view, and make it very difficult or impossible to discern the location of the end of the mercury thread.

Various attempts in the past have been made to remedy this difficulty of total reflection from the bore. For example, bores have been constructed having very sharp edges at the sides, designed to reduce the possible region from which undesirable reflections may occur. Such a construction causes difficulty, however, in that it is hard to manufacture and also in that droplets of mercury are caused to adhere in the sharp troughs at the sides of the bore.

In my pending application filed June 8, 1946, Serial No. 675,399, I have disclosed a thermometer tube featuring, among other advantages, binocular visibility, a feature which, if it is to be attained with advantage, requires the elimination of the difficulty of total internal reflections by simple means. In one embodiment disclosed in that application, there is provided a dark stripe, embracing the bore from the rear and having forwardly extending portions adapted to shield the bore in its zones where total internal reflection would otherwise occur. Embracing the dark stripe from the rear, and subtending a somewhat greater angle at the bore, is a white or light stripe. As is explained in that application, that construction provides a thermometer tube wherein the mercury thread appears consistently bright against a dark background, and wherein total internal reflections are eliminated.

The present invention is, in a number of respects, an improvement over the invention disclosed in the previously-mentioned application.

An object of the present invention is to provide a thermometer tube free from the difficulties of total internal reflections from the empty bore and which is simple and cheap to construct.

Another object of the present invention is to provide an easily readable thermometer tube having a light-colored background against which the mercury thread may be viewed.

In the present application, the expression "light-colored" will be understood to include white as well as various colors.

Another object of the present invention is to provide a thermometer tube having light-colored stripe means of the same shade throughout, constructed and arranged to prevent total internal reflections from the empty bore, to diminish undesirable effects caused by reflections from the mercury thread, to raise the general level of illumination in the tube, and to serve as a light-colored background for the mercury thread.

Another object of the present invention is to provide a thermometer tube having the feature of binocular visibility of the bore, combined with freedom from total internal reflections at the bore, and a light-colored background against which the bore may be viewed.

The above mentioned, as well as other objects, together with many advantages obtainable by the practice of the present invention will be readily comprehended by persons skilled in the art by reference to the following detailed description taken in connection with the annexed drawings which respectively describe and illustrate preferred embodiments of the invention and wherein Fig. 1 is a front elevational view of a mercury-in-glass thermometer, having a white background for the mercury.

Figure 2:
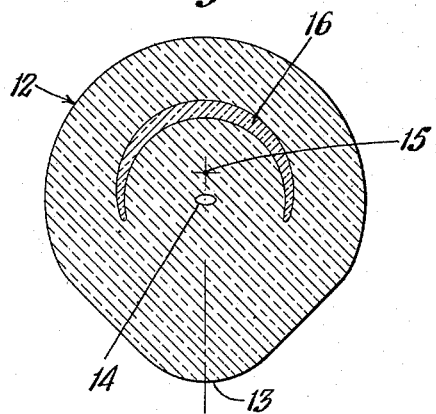
Figure 3:
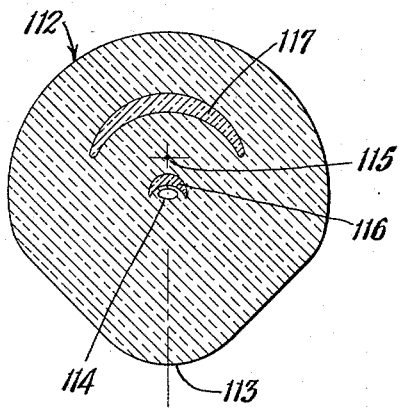

Figs. 2 and 3 are enlarged cross-sectional views of thermometer tubes illustrating different embodiments of the present invention.

Reference is made to Fig. 1. In this figure there is illustrated a thermometer to which the teachings of this invention are applicable. Such a thermometer may be provided with a glass bulb 10 filled with mercury 11. Integrally connected to this glass bulb is a glass tube, generally indicated at 12.

Reference is made to Fig. 2 which shows, in enlarged cross-section, one embodiment of a thermometer tube illustrating the teachings of the present invention. The tube 12 is provided with a lens front or cylindrical viewing lens 13. It is to be understood that the term "cylindrical" is used in this application with its broad meaning, applied to any curved surface generated by the motion of a straight line parallel to itself and constantly intersecting a curve. It may be noted that this curve need not necessarily be circular. While the lenses in the illustrated embodiments of this invention may satisfactorily have cross-sectional contours which are circular arcs, the present invention is not limited to such configurations. The tube 12 is provided with a lengthwise or longitudinal bore 14 located in the axial plane of the lens 13 and closer to this lens than the principal focal line of this lens. The position of this focal line, in the rear of the bore, is indicated by the numeral 15. The bore 14 may be shaped in cross-section in the form of an ellipse with its major axis perpendicular to the axial plane of the viewing lens 13, in order to diminish the side zones where total internal reflections may occur.

The tube is provided with a stripe or band 16 of white or light-colored glass. This stripe is generally parallel to the bore 14 and, in cross-section, embraces same from the rear, that is, from the direction opposite the lens 13, through a subtended angle of more than 180° and not more than approximately 210°, or preferably nearer to this upper limit. Thus the stripe 16 may extend in a somewhat circumferential manner partly around the bore, so as to subtend at the bore approximately 30° more than the rear half of the tube, that is, 15° beyond half at each end. The stripe 16 is provided with forwardly extending portions which serve to shield the bore in its zones of total internal reflection, as will be more particularly described.

The focal line 15 in the illustrative embodiment may be considered to be located sufficiently in the rear of the bore to provide binocular visibility of the entire width of the bore. The feature of binocular visibility will be understood to mean that the mercury may be seen in both eyes of an observer when the eyes are located in a line at right angles to the axial plane of the lens and symmetrically spaced from said plane, said line being at a distance of approximately 10 inches from the lens front. This 10-inch distance is approximately the average near point distance of normal vision. Since the average spacing between the eyes of humans is about 2.5 inches, it follows that for binocular visibility, light from the bore should, upon passing through the lens, diverge in a wedge, the angle between the sides of which is at least approximately 14°. Further details of the simple optics involved in this feature may be understood by reference to the aforementioned application Serial No. 675,399, particularly Fig. 6 thereof.

It may be assumed in the present discussion that the glass comprising the main body of the thermometer tube is of such composition that total internal reflection of a light ray striking a glass-to-air boundary, such as that at the empty bore, will occur only if the angle of incidence between the ray and the normal to the boundary is greater than approximately 42°. It has been found that if such a thermometer tube is provided with a stripe of the type shown in Fig. 2, embracing the bore from the rear through an angle of approximately 210°, troublesome total internal reflections at the bore will be substantially eliminated.

The forwardly extending end portions of the stripe 16 should extend forwardly only far enough to shield the bore in its zones of total internal reflection. The zones of total internal reflection will be understood to be those areas of the walls of the bore from which light rays may be totally reflected through the lens into the eye of the observer. These zones will in general have as a rear boundary, a plane passing through the bore perpendicular to the axial plane of the lens. They will extend forwardly of this boundary a distance depending somewhat upon the constructional features of the tube, such as the shape and position of the lens, this distance also depending upon the position from which the thermometer is viewed. In general, however, the most troublesome zones of total internal reflection will extend forwardly about 15° beyond the rear half of the tube, when a lens of the type described herein is used. It should be noted, however, that the successful shielding action of the stripe 16 requires that it be continuous over the rear half of the tube. For the purpose of explaining why the shield portions of the stripe 16 should extend forwardly only a sufficient distance to shield the zones of total internal reflection, let us consider a different and rather unsatisfactory construction in which a stripe surrounds the bore almost completely except for a very small opening toward the lens. The forwardly extending portions of such a stripe would be reflected by the empty bore and also by the mercury-filled portions of the bore into the eye of the observer to an extent sufficient to interfere with satisfactory use of the thermometer. A stripe of that type would thus diminish the effective width of the mercury thread seen by the observer. Such a stripe, furthermore, would lower the level of illumination of the background. In a tube having a light-colored background this is, of course, undesirable. On the other hand, with the construction shown in Fig. 2, while it is true that the forwardly extending portions of the stripe may, when the thermometer is held in certain positions, be to some slight extent reflected into the eye of the observer by the mercury thread and by the empty bore, it should be noted that this effect is minimized by extending the ends of the stripe no farther forward than necessary to substantially eliminate glitter of the bore from total internal reflections. The stripe does not extend far enough around on the front side of the bore to substantially diminish or narrow the effective width of the mercury thread seen by the observer. Moreover, since the background and the shield portions are of the same shade, reflections of the stripe will be imperceptible. For example, if the stripe is white, these reflections will appear merely as thin white lines along the right- and left-hand sides of the mercury, and will merge with the white background.

By way of summary it may be stated that the light-colored stripe 16 is constructed and arranged to serve several purposes. It serves as a light-colored background in the line of sight past the bore, against which the mercury thread may be viewed. It also provides shield portions to shield the empty bore from incident light rays in zones where troublesome total internal reflections would otherwise occur. These shield portions are of the same shade as the background, thereby causing any reflections of these shield portions from the mercury or the bore to merge with the background. The stripe, furthermore, provides a construction which is advantageously combined with a lens focused a sufficient distance in the rear of the bore to provide binocular visibility of the entire width of the bore since the side zones of the bore are free from glitter. Finally, the light-colored stripe aids in providing a high level of illumination within the tube. These functions are, moreover, accomplished with a simple construction which lends itself to economy of production.

Fig. 3 discloses a different embodiment of the present invention having the advantage that, because of the arrangement of the stripe means therein, the background appears to be remarkably bright, thereby providing better contrast with the mercury thread. In Fig. 3 there is provided a thermometer tube 112 having a lens front 113, and a longitudinal bore 114. The focal line 115 of the lens front 113 is located behind the bore 114 and is positioned to provide binocular visibility. The tube is provided with a longitudinal white or light-colored arcuate stripe 116, behind and close to the bore and generally parallel thereto. The stripe 116 as shown is relatively small or narrow, but extends around the bore 114 through an angle of more than 180° and not more than approximately 210°, or preferably approximately 210°. Stated differently, the stripe 116 should subtend at the bore 114 an angle sufficiently greater than the rear half of the tube to shield the bore from light rays in its zones of total reflection. In addition to serving as a shield, the stripe 116 also serves as a background for the bore.

Behind and displaced from the stripe 116 there is provided a broader arcuate stripe 117 of white or light-colored glass. The stripe 117 is for the purpose of keeping the general illumination of the tube at a high level and concentrating light upon the central stripe 116, which may advantageously be translucent, while the stripe 117 may be opaque.

While Fig. 3 shows the stripe 116 extending through an angle of approximately 210° and the stripe 117 extending through an angle much less than this, the respective spanned angles of these stripes may be reversed. In this case the stripe 117 would be similar to the stripe 16 of Fig. 2, performing the same functions, and the stripe 116 could span a lesser angle. In either case the translucent stripe 116 appears particularly bright because the diffused illumination from the stripe 117 is to a large extent concentrated upon it.

The stripes 116 and 117 may, for economy, be of the same composition, the stripe 116 being thinner than the stripe 117, whereby the stripe 116 may be translucent while the stripe 117 is relatively opaque.

On the other hand in a different embodiment, the stripes 116 and 117 may not necessarily have the same composition, color or shade. The stripe 116 may be colored lightly, for example, light yellow or red, while the stripe 117 may be white. With this embodiment, it is preferable that the general arrangement illustrated in Fig. 3 be used, that is, that the stripe 116 span an angle of more than 180° and not more than approximately 210°, with the stripe 117 spanning a lesser angle than the stripe 116.

While the illustrative forms of the invention have been disclosed in considerable detail, it will be understood that various changes may be made in the construction and arrangement of the several parts without departing from the general principles and scope of the invention as defined by the appended claims.

I claim:

1. A thermometer tube having a longitudinal bore, a lens having its principal focal line behind said bore, and a light-colored longitudinal shield stripe embracing said bore from the rear subtending at said bore in cross-section an angle of more than 180° and not more than 210°.

2. A thermometer tube having a longitudinal bore, a lens having its principal focal line behind said bore, and a light-colored longitudinal shield stripe embracing said bore from the rear, subtending at said bore in cross-section an angle of substantially 210° toward the rear of said tube.

3. A thermometer tube having a longitudinal bore, a cylindrical lens on the front of said tube, the principal focal line of said lens being located sufficiently in the rear of said bore to provide binocular visibility thereof, embedded stripe means of light-colored glass, said means comprising a portion generally behind said bore positioned to form a background against which said bore may be viewed through said lens, and shield portions at the sides of and extending forwardly of said bore only sufficiently to substantially eliminate internal reflection from said bore, said shield portions being of the same shade as said background portions.

4. A thermometer tube having a longitudinal bore, a cylindrical lens on the front of said tube having its principal focal line located a great enough distance behind said bore to provide binocular visibility thereof, and a light-colored background and shield stripe embracing said bore from the rear throughout a substantially circular arc of approximately 210°.

5. A thermometer comprising a tube having a longitudinal bore, a bulb communicating with said bore, mercury within said bulb and a portion of said bore, a lens on the front of said tube having its principal focal line behind said bore, and a single, light-colored, stripe embracing said bore from the rear, said stripe having a portion extending throughout a subtended angle at said bore of 180° toward the rear of said tube to serve as a background in the line of sight past the bore, and having portions extending forwardly a distance only sufficient to shield the zones of total reflection of the empty bore, said last-mentioned portions being of the same shade as said first-mentioned portion so that as reflected by the bore, the reflections merge with the background, said stripe being of a light shade throughout, to raise the general level of illumination within the tube.

6. A thermometer tube having a longitudinal bore, a lens front having its principal focal line behind said bore, a first relatively narrow translucent stripe embedded in said tube behind and close to said bore, subtending at said bore an angle sufficiently greater than the rear half of said tube to shield said bore from light rays in its zones of total reflection, and a somewhat broader light-colored background stripe behind said first stripe.

7. A thermometer tube having a longitudinal bore, a lens front having its principal focal line behind said bore, an arcuate translucent stripe behind and close to said bore, subtending an angle at said bore of more than 180° and not more than 210° opposite said lens and a second arcuate stripe generally behind said first stripe, subtending an angle at said bore of less than 180°.

8. A thermometer comprising a tube having a longitudinal bore, a bulb communicating with said bore, and mercury in said bulb and a portion of said bore, said tube having a cylindrical viewing lens on the front thereof having its principal focal line behind said bore to facilitate reading of said thermometer from positions displaced from the axial plane of said lens, said tube being provided with a narrow arcuate, translucent stripe close to said bore and embracing it from the rear through an angle of substantially 210°, and a broader light-colored stripe behind said narrow stripe and displaced therefrom.

9. A thermometer tube having a longitudinal bore, a lens on the front of said tube having its principal focal line behind said bore, a light-colored, arcuate, translucent stripe behind said bore, and a light-colored, arcuate stripe behind said translucent stripe to increase the brightness of same, one of said stripes embracing said bore through an angle of more than 180° and not more than 210°.

10. A thermometer tube having a longitudinal bore, a lens on the front of said tube, a translucent stripe embracing said bore from the rear, and a light-colored stripe behind said translucent stripe, one of said stripes subtending at said bore an angle of more than 180° and not more than 210°.

11. A thermometer tube having a longitudinal bore, a lens front having its principal focal line behind said bore, a translucent stripe behind and close to said bore, subtending at said bore an angle of more than 180° and not more than 210°, said stripe being colored lightly and being of the same shade throughout, and a light-diffusing stripe behind and spaced from said translucent stripe.

CHARLES O. FAIRCHILD.

REFERENCES CITED

The following references are of record in the file of this patent:

UNITED STATES PATENTS

| Number | Name | Date |
|---|---|---|
| 278,380 | Weinhagen | May 29, 1883 |
| 317,783 | Hicks | May 12, 1885 |
| 1,561,925 | Hespe | Nov. 17, 1925 |
| 1,692,381 | Norwood | Nov. 20, 1923 |
| 2,035,663 | Norwood | July 20, 1932 |
| 2,179,773 | Young | Nov. 14, 1939 |